United States Patent
Millet et al.

(10) Patent No.: US 7,716,468 B2
(45) Date of Patent: May 11, 2010

(54) METHOD AND SYSTEM FOR CLONED CABLE MODEM DETECTION

(75) Inventors: Mark Millet, Mountain View, CA (US); Anish Thomas, Koorachund (IN)

(73) Assignee: Cisco Technology, Inc., San Jose, CA (US)

( * ) Notice: Subject to any disclaimer, the term of this patent is extended or adjusted under 35 U.S.C. 154(b) by 1097 days.

(21) Appl. No.: 11/373,807

(22) Filed: Mar. 10, 2006

(65) Prior Publication Data

US 2007/0208932 A1    Sep. 6, 2007

(30) Foreign Application Priority Data

Mar. 1, 2006    (IN) .......................... 542/DEL/2006

(51) Int. Cl.
*H04L 9/00*    (2006.01)
(52) U.S. Cl. ...................... 713/153; 725/111; 709/223; 709/249; 455/428; 713/168
(58) Field of Classification Search .................. None
See application file for complete search history.

(56) References Cited

U.S. PATENT DOCUMENTS

| 7,272,846 B2* | 9/2007 | Williams et al. ............ 725/111 |
| 7,512,969 B2* | 3/2009 | Gould et al. .................. 726/4 |
| 2008/0109864 A1* | 5/2008 | Danforth et al. ............ 725/111 |
| 2009/0070800 A1* | 3/2009 | Gould et al. .................. 725/25 |

OTHER PUBLICATIONS

Sasha Madvinsky, Steven Anderson: Don't Let Your Modem be Cloned, DOCSIS Security Protects Your System; Communications Technology; 8 pages, Jun. 2000; Jun. 2000 Issue, Feature.

* cited by examiner

*Primary Examiner*—Nasser Moazzami
*Assistant Examiner*—Fikremariam Yalew
(74) *Attorney, Agent, or Firm*—Trellis IP Law Group, PC (57) ABSTRACT

A method and a system for providing a service in a network, is provided. In one embodiment, a first modem with a first address, which is identical to a second address of a second modem, requests for services in the network. A modem termination system (MTS) checks whether the first modem is a clone of the second modem. If the first modem is identified to be the clone of the second modem, then, the first modem is restricted from obtaining the requested service. However, the second modem is continuously provided services.

17 Claims, 7 Drawing Sheets

METHOD AND SYSTEM FOR CLONED CABLE MODEM DETECTION

CLAIM OF PRIORITY

This invention claims priority from Indian Patent Application No. 542/DEL/2006 filed on Mar. 1, 2006 entitled "Method and System for Cloned Cable Modem Detection" which is hereby incorporated by reference as if set forth in full in this document for all purposes.

BACKGROUND OF THE INVENTION

1. Field of Invention

Embodiments of the invention relate, in general, to cable networks. More specifically, embodiments of the invention relate to methods and systems for detecting a cloned cable modem in a cable network.

2. Description of the Background Art

A cable network is a programming service, which includes a number of cable modems. The cable modems operate according to an international standard known as Data Over Cable Service Interface Specification (DOCSIS). A cable modem termination system (CMTS) and the cable modems together constitute the primary components of the DOCSIS. In a DOCSIS-based cable network, each cable modem has a specific Medium Access Control (MAC) address, which is globally unique. Each cable modem is configured in the cable network according to the MAC address.

A cable modem has to complete steps as specified in the Baseline Privacy Interface Plus (BPI+) security negotiation process. The cable modem may be further authenticated by proving private key certificates, stored in the cable modem, valid via cryptographic key exchange. Moreover, the CMTS inserts a cryptographic signature in a Message Integrity Check (MIC) field. The MIC allows a one-time registration of the cable modem. The MIC matches the cryptographic signature and allows registration of the cable modem. This feature is known as cable dynamic-secret, which is also known as DMIC. The purpose of DMIC is to ensure that if a cable modem with a MAC address "M" tries to access the network, must only utilize parameters assigned by provisioning to the cable modem whose MAC address is "M. Therefore, the DMIC protects against re-registration of the cable modem with the same cryptographic signature.

DETAILED DESCRIPTION OF EMBODIMENTS OF THE INVENTION

Various embodiments of the invention provide methods, systems, and computer-readable media for providing a service in a network. In the description herein for embodiments of the present invention, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

A network includes a number of modems. A service provider provides network services to the modems on the basis of an address of the modem. Network services include connection to the Internet or Voice over IP (VoIP), and the like. A miscreant user in a network can clone the address of a legitimate modem and access the network services without paying to the service provider. 'Cloning an address includes duplication of a legitimate device's address by a 'clone' or 'cloned' device such that the cloned device appears similar to the legitimate device. Further, cloning can include duplicating or imitating other device characteristics, including all detectable characteristics of the legitimate device. As the clone 'improves', the similarities in characteristics of the legitimate device and the cloned device increase. Typically, the more characteristics that are duplicated, the more difficult it is to determine that a cloned device is not legitimate and additional tests are required to distinguish the cloned device and the legitimate device. Eventually, the cloned device may improve to become sufficiently identical, that all practical tests to distinguish the legitimate device from the cloned device become obsolete, or provide insufficient certainty to make a reliable determination.

In case of the cable modems, the cloned cable modem may potentially be identical to the legitimate cable modem in all characteristics, including private keys used for a baseline privacy interface plus (BPI+) cryptographic exchanges and authentication. According to various embodiments of the invention, a modem termination system detects cloning in the network. Further, the modem termination system identifies the cloned modem and restricts the cloned modem from obtaining access to the network services. Furthermore, the modem termination system provides continuous network services to the legitimate modem.

Figure 1:
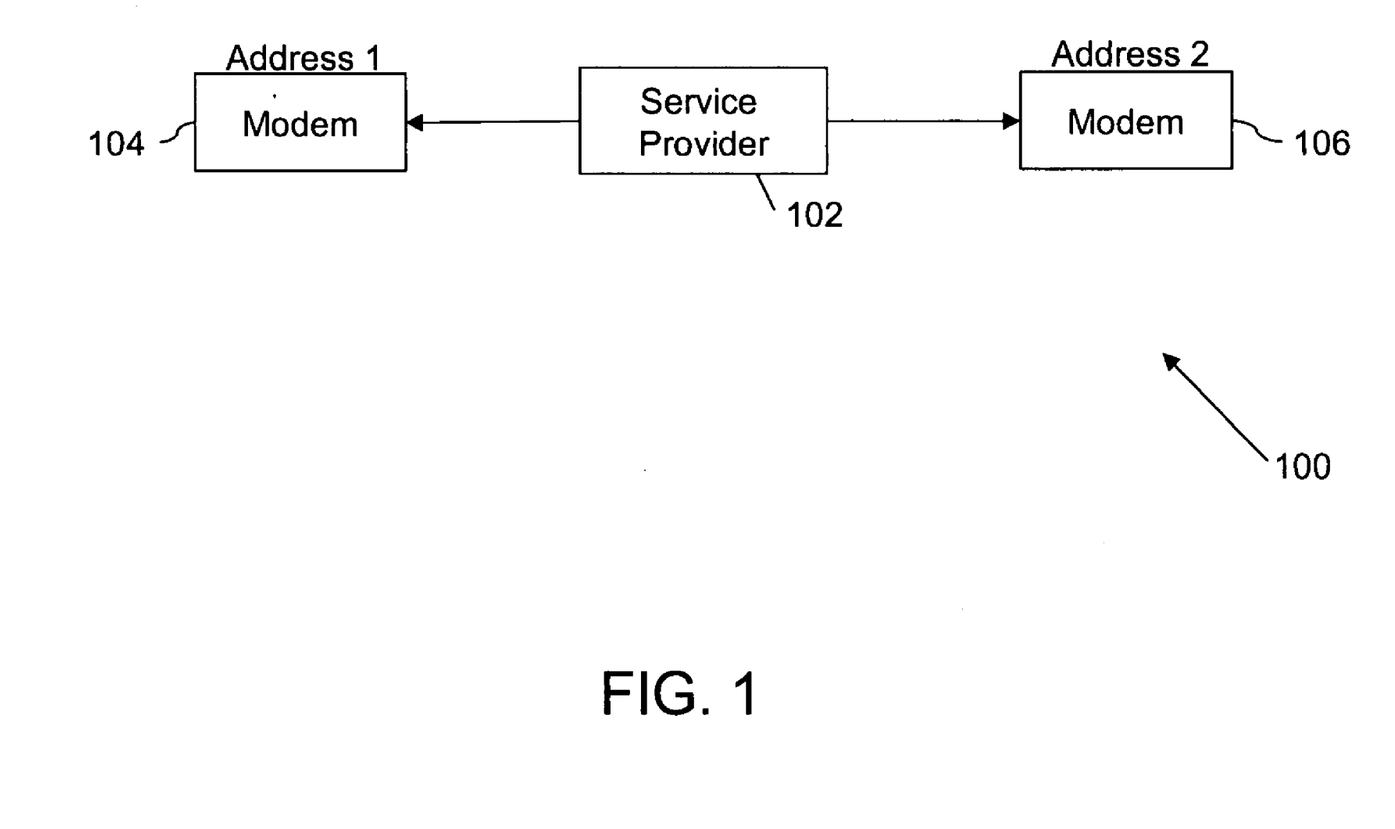
FIG. 1 illustrates an environment wherein an embodiment of the invention can be practiced.

Referring to the drawings, particularly by their reference numbers, FIG. 1 illustrates an environment, wherein an embodiment of the invention can be practiced. Environment 100 includes a network, which includes service provider 102, and a number of modems. For the purpose of illustration, only two modems, modem 104 at an address 1, and modem 106 at an address 2, are shown in FIG. 1. The network can be any suitable network and can include cable, hardwired, wireless, optical, etc. types of communication links. In a preferred embodiment, the network follows the Data Over Cable Service Interface Specification (DOCSIS). In other embodiments, different standards and protocols may be used, as desired.

Modems 104 and 106 include a modulator and a demodulator. Modems 104 and 106 are communication devices that convert a signal from one form to another. The converted signal is suitable for transmission over a communication channel such as a telephone line, a cable line, and the like. Modems 104 and 106 can be cable modems, wireless modems, and the like. Service provider 102 is a network-addressable entity that accepts and executes requests from users. Service provider 102 can be a mainframe system, a component, or a type of software system that executes the requests.

Service provider 102 provides network services to a specific address. The address is a Medium Access Control (MAC) address. The MAC address is written as 12 hexadecimal characters (0-9, A-F). The characters are paired and the pairs are separated by a colon or a hyphen. Each modem in the network has a unique MAC address. However, a miscreant user may clone the MAC address of a modem in the network. The cloned modem with the cloned MAC address can be used for obtaining access to the network services without actually paying to service provider 102. Therefore, various embodiments of the invention detect cloning in the network. Further, the cloned modem is restricted from obtaining the network services, while the legitimate modem is allowed to continuously obtain the network services.

Figure 2:
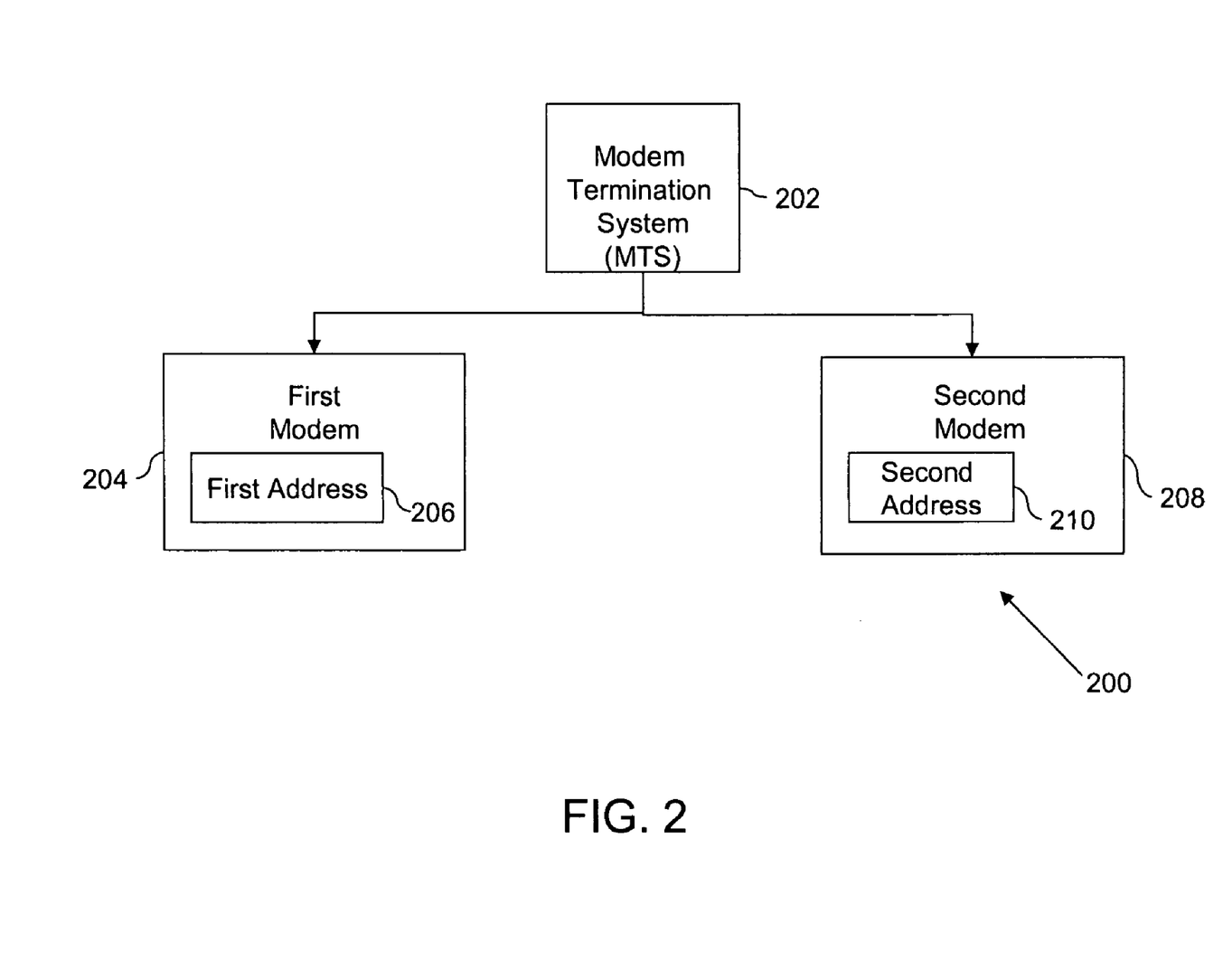
FIG. 2 illustrates a system for providing a service in a network, in accordance with an exemplary embodiment of the present invention.

FIG. 2 illustrates a system for providing a service in a network, in accordance with an exemplary embodiment of the present invention. System 200 includes Modem Termination System (MTS) 202, first modem 204 at first address 206, and second modem 208 at second address 210. MTS 202 is typically found at service provider 102. MTS 202 provides high-speed network services. These network services include connection to data networks such as connection to the Internet, the Cable Internet, the VoIP and the like. MTS 202 communicates with the data networks through, for example, optical fiber, microwave link, satellite link, or various other media, to provide the network services to users by identifying and using the MAC address of each modem in the network.

First modem 204 and second modem 208 are modems, which include the modulator and the demodulator. First modem 204 at first address 206 is a modem that requests MTS 202 for obtaining a service. Second modem 208 is present in the network at second address 210. A miscreant user may clone second address 210 on first modem 204, such that second address 210 and first address 206, are identical.

According to various embodiments of the invention, first modem 204 places a request with MTS 202. The request is a ranging request for obtaining the service in the network. The ranging request can be of various types such as a request with a Service Identifier (SID) 0, while initially requesting for the service. The ranging request with the SID 0 is valid at a time when a modem tries to re-initialize its MAC address to be online again. The state of being 'online' refers to the state when a device is connected to the network and can communicate within the network. Further, the ranging request can be a request with a valid SID while initially requesting for the network services. Furthermore, the ranging request can be a request with a valid SID during station maintenance.

On receiving the ranging request, MTS 202 identifies that first address 206 is identical to second address 210. However, second modem 208, which is also called the 'legitimate modem', is already present in the network. Further, MTS 202 checks whether first modem 204 is a clone of second modem 208. In case MTS 202 identifies first modem 204 to be the clone of second modem 208, then MTS 202 provides continuous network services to second modem 208 and restricts first modem 204 from obtaining the requested service.

Figure 3:
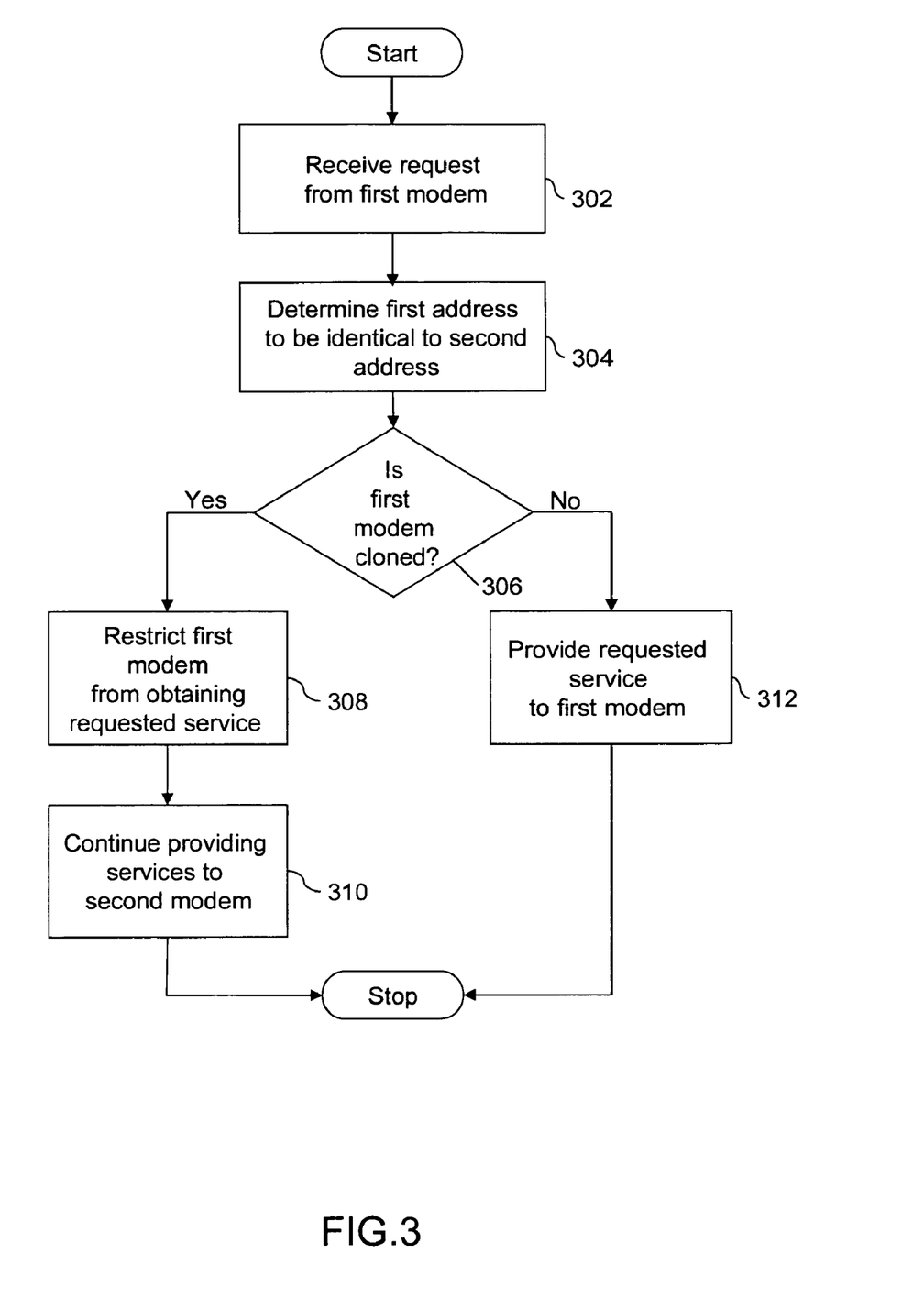
FIG. 3 illustrates a flowchart of a method for providing a service in a network, in accordance with an exemplary embodiment of the present invention.

FIG. 3 illustrates a flowchart for a method for providing a service in a network, in accordance with an exemplary embodiment of the present invention. At step 302, MTS 202 receives the request from first modem 204. The request is the ranging request for obtaining the network services. At step 304, MTS 202 determines that first address 206 is identical to second address 210. At step 306, MTS 202 checks if first modem 204 is a clone of second modem 208. To determine whether first modem 204 is the clone of second modem 208, MTS 202 adopts a procedure that depends on the status of second modem 208. Second modem 208 can be online or offline. The state of being 'offline' refers to the state when a device cannot communicate with the network. Details that determine whether the first modem 204 is the clone are described in conjunction with FIGS. 4a and 4b. If MTS 202 identifies first modem 204 to be the clone of second modem 208, then MTS 202 restricts first modem 204 from obtaining the requested service, at step 308. However, MTS 202 provides continuous network services to second modem 208, at step 310. If MTS 202 identifies that first modem 204 is not the clone of second modem 208, then MTS 202 provides the requested service to first modem 204, at step 312.

Figure 4A:
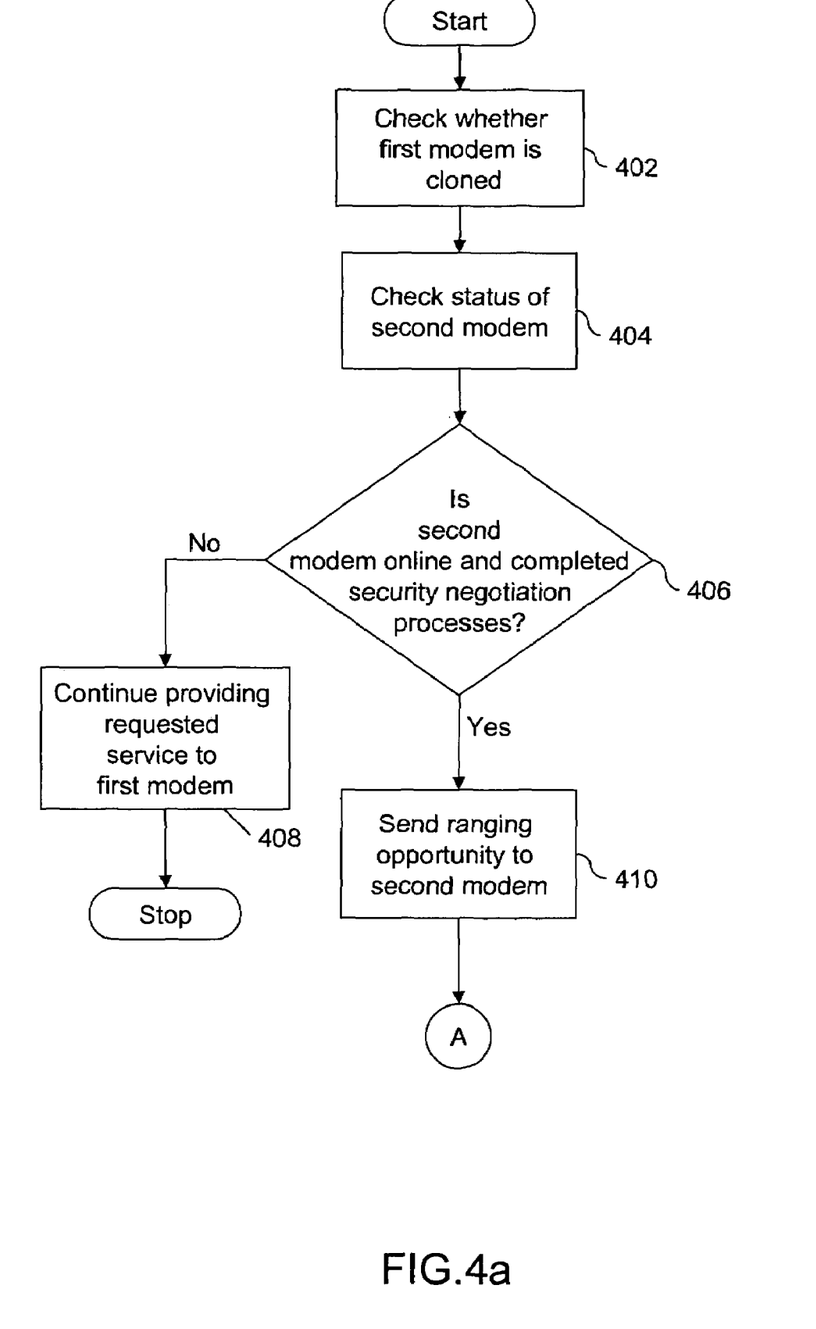
FIG. 4a illustrates a first portion of a flowchart for a method for checking cloning in a network.
Figure 4B:
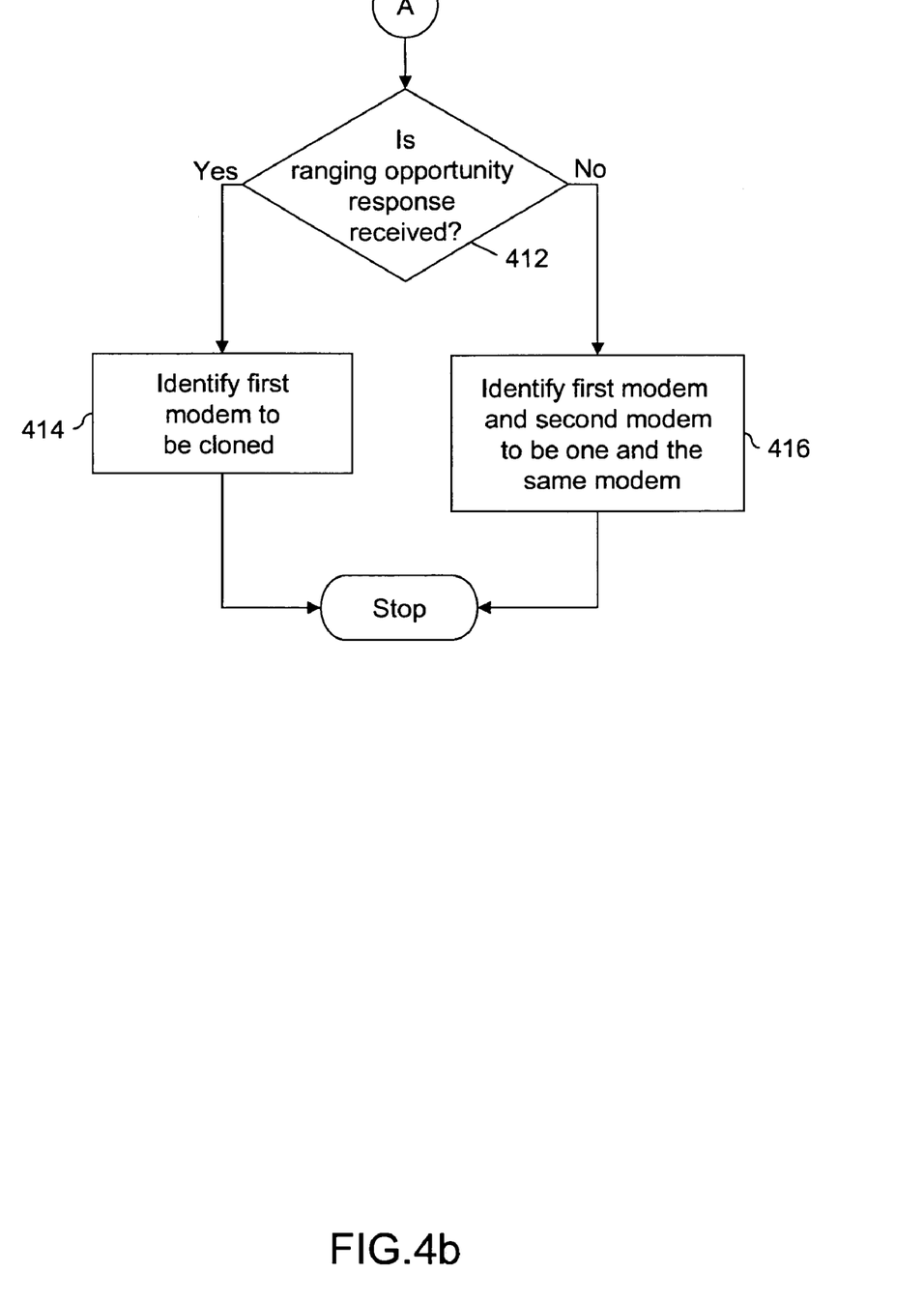
FIG. 4b illustrates a second portion of a flowchart for a method for checking cloning in a network.

FIGS. 4a and 4b illustrate a flowchart for a method for checking if first modem 204 is the clone of second modem 208, in accordance with an exemplary embodiment of the present invention. MTS 202 receives the ranging request from first modem 204. MTS 202 identifies that first address 206 is identical to second address 210.

At step 402, MTS 202 checks if first modem 204 is the clone of second modem 208. At step 404, MTS 202 checks the status of second modem 208. At step 406, MTS 202 checks whether second modem 208 is online and has completed security negotiation processes. Second modem 208 can be online or offline.

The security negotiation processes include a baseline privacy interface plus (BPI+) security negotiation process and a dynamic shared secret (DMIC). The BPI+ provides a data-encryption scheme that protects the data exchanged between the modems in the network. The BPI+ is also used to authenticate the modems in the network. Further, the BPI+ authorizes communication between a single sender and multiple receivers in the network.

Moreover, MTS 202 inserts a one-time password and a cryptographic signature into a message integrity check (MIC) field of a configuration file at the time of the first configuration. MTS 202 obtains the configuration file, which is used by a modem for configuring in the network. The file is obtained from a configuration server. The MIC field allows the modem to register only once. This feature is called, 'cable dynamic-secret', or DMIC, in case of a cable network.

If second modem 208 is not online and has not completed the security negotiation processes, then, at step 408, MTS 202 continues providing the requested service to first modem 204. If second modem 208 is online and has completed the security negotiation processes, then, at step 410, MTS 202 sends a ranging opportunity to second modem 208. The ranging opportunity is an offer for providing the network services. At step 412, MTS 202 checks if a ranging opportunity response is received. If MTS 202 receives the ranging opportunity response, MTS 202 identifies first modem 204 to be the clone of second modem 208, at step 414. In case first modem 204 is identified to be the clone of second modem 208, MTS 202 provides continuous network services to second modem 208 and restricts first modem 204 from obtaining the requested service. If MTS 202 does not receive the ranging opportunity response, then, at step 416, MTS 202 identifies first modem 204 to be second modem 208, wherein second modem 208 is trying to re-initialize in the network.

Figure 5:
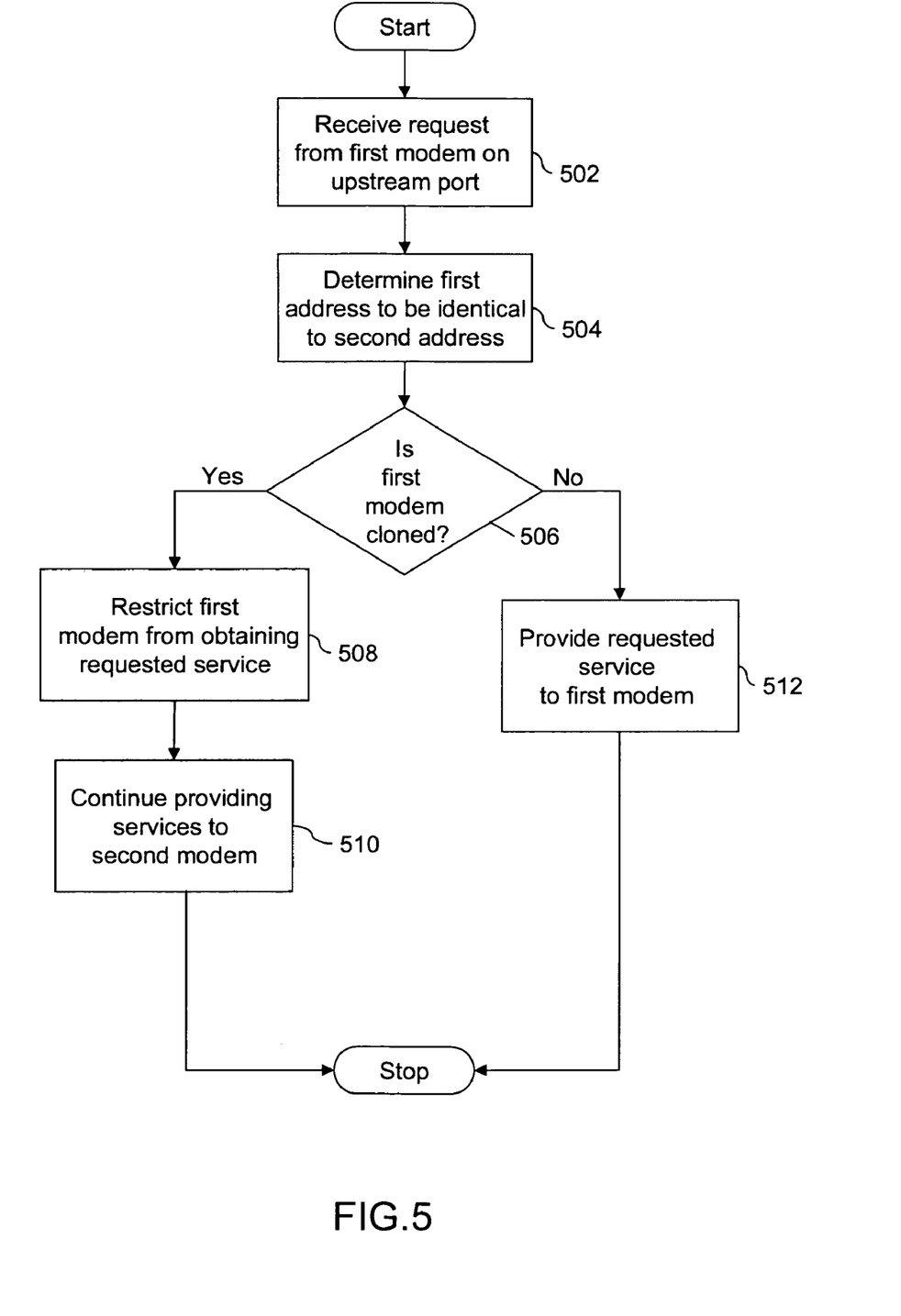
FIG. 5 illustrates a flowchart of a method for providing a service in a network, in accordance with another exemplary embodiment of the invention.

FIG. 5 illustrates a flowchart for a method for providing a service in a network, in accordance with another exemplary embodiment of the invention. At step 502, MTS 202 receives the request for obtaining access to the service from first modem 204, which is present on an upstream port. The upstream port is a communication channel that enables data communication from the modems to MTS 202 in the network. However, second modem 208 is also present on the same upstream port. Therefore, first modem 204 and second modem 208 try to connect to MTS 202 through a single upstream port and through one interface only.

At step 504, MTS 202 determines that first address 206 is identical to second address 210. At step 506, MTS 202 checks if first modem 204 is the clone of second modem 208, while first modem 204 and second modem 208 are present on the same upstream port. If MTS 202 identifies first modem 204 to be the clone of modem 208, then, at step 508, MTS 202 restricts first modem 204 from obtaining the requested service in the network. Further, at step 510, MTS 202 provides continuous network services to second modem 208. If MTS 202 identifies that first modem 204 is not the clone of second modem 208, then, at step 512, MTS 202 provides the requested service to first modem 204.

Figure 6:
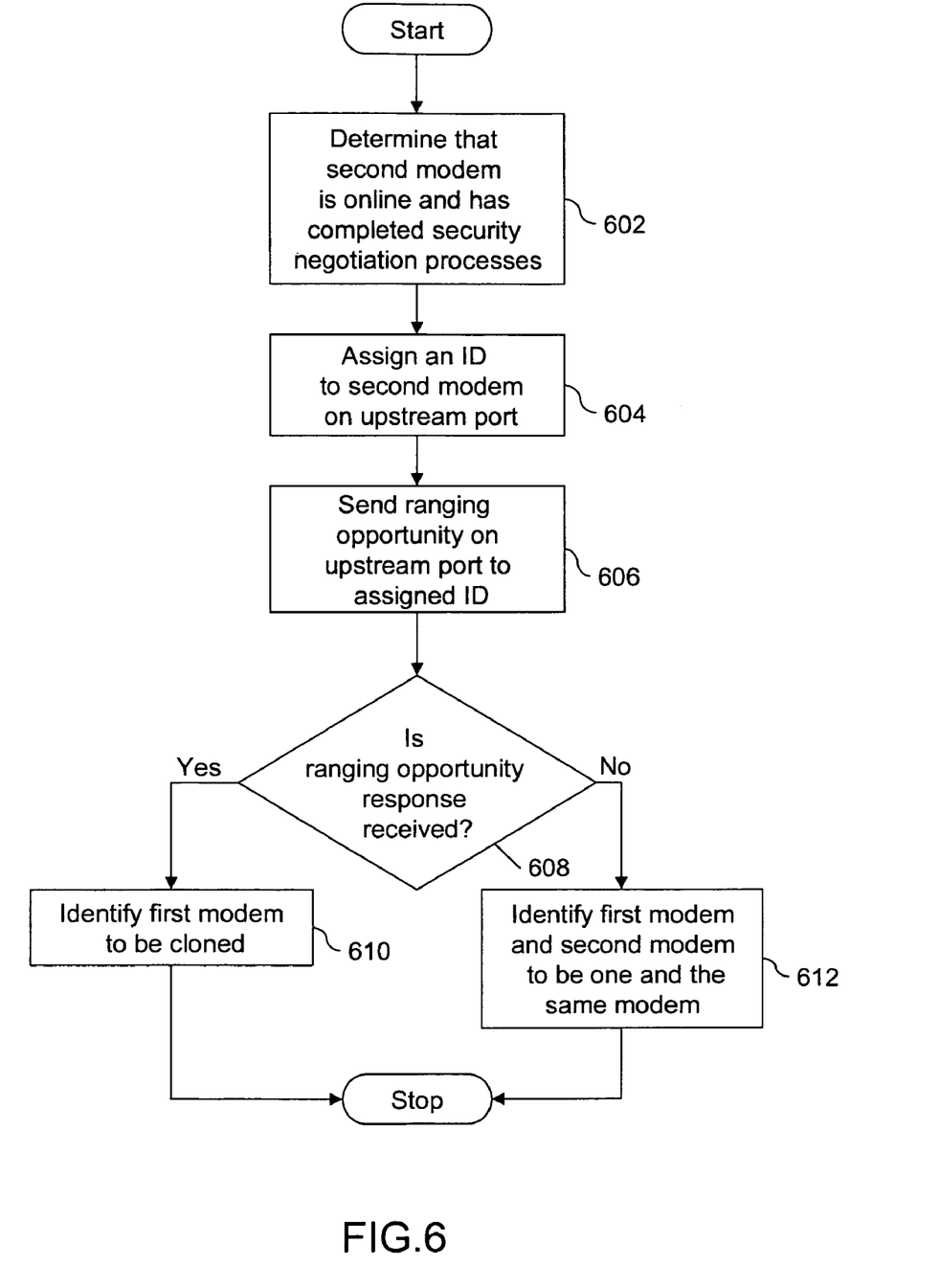
FIG. 6 illustrates a flowchart of a method for checking cloning in a network, in accordance with another exemplary embodiment of the invention.

FIG. 6 illustrates a flowchart for a method for checking if first modem 204 is the clone of second modem 208, in accordance with another exemplary embodiment of the invention. At step 602, MTS 202 determines that second modem 208 is online and has completed the security negotiation processes. At step 604, MTS 202 assigns an SID, for example, SID 525, which is different from SID 0 or an initial ranging SID, to second modem 208 on the upstream port. However, first modem 204 appears on SID 0. At step 606, MTS 202 sends the ranging opportunity on the upstream port for SID 525. At step 608, MTS 202 checks if the ranging opportunity response is received. If MTS 202 receives the ranging opportunity response, MTS 202 identifies that there are two modems with the same MAC address, trying to obtain the network services. Therefore, MTS 202 identifies first modem 204 to be the clone of second modem 208, at step 610. If MTS 202 does not receive the ranging opportunity response, MTS 202 identifies first modem 204 to be second modem 208, which is trying to reinitialize in the network, at step 612.

Various embodiments of the invention provide a method for providing a service in a network. The method comprises receiving a request for the service from a first modem at a first address, wherein the first address is identical to a second address of a second modem; checking whether the first modem is a clone of the second modem; and if the first modem is the clone of the second modem, restricting the first modem from obtaining the requested service; and providing services to the second modem, wherein the services are provided continuously to the second modem; else providing the requested service to the first modem.

In an embodiment of the invention, a method for providing a service in a network is provided. The method comprises receiving a request for the service from a first modem at a first address, wherein the first address is identical to a second address of a second modem and the first modem and the second modem are on an upstream port; checking whether the first modem is a clone of the second modem; and if the first modem is the clone of the second modem, restricting the first modem from obtaining the requested service; and providing services to the second modem, wherein the services are provided continuously to the second modem; else providing the requested service to the first modem.

Various embodiments of the invention provide a system for providing a service in a network. The system comprises a first modem at a first address, wherein the first modem sends a request for the service and the first address is identical to a second address; a second modem at the second address, wherein the second modem is present in the network; and a modem termination system (MTS), wherein the MTS identifies whether the first modem is a clone of the second modem and if the first modem is the clone of the second modem, the MTS provides continuous services to the second modem.

Various embodiments of the invention provide a system for providing a service in a network. The system comprises means for receiving a request for the service from a first modem at a first address, wherein the first address is identical to a second address of a second modem; means for checking whether the first modem is a clone of the second modem; and if the first modem is the clone of the second modem, means for restricting the first modem from obtaining the requested service; and means for providing services to the second modem, wherein the services are provided continuously to the second modem; else means for providing the requested service to the first modem.

Various embodiments of the invention provide a machine-readable medium including instructions executable by a processor. The machine-readable medium comprises one or more instructions for receiving a request for a service from a first modem at a first address, wherein the first address is identical to a second address of a second modem; one or more instructions for checking whether the first modem is a clone of the second modem; and if the first modem is the clone of the second modem, one or more instructions for restricting the first modem from obtaining the requested service; and one or more instructions for providing services to the second modem, wherein the services are provided continuously to the second modem; else one or more instructions for providing the requested service to the first modem.

Various embodiments of the invention provide an apparatus for providing a service in a network. The apparatus comprises a processor for executing instructions; and a machine-readable medium including instructions executable by the processor. The machine-readable medium comprises one or more instructions for receiving a request for the service from a first modem at a first address, wherein the first address is identical to a second address of a second modem; one or more instructions for checking whether the first modem is a clone of the second modem; and if the first modem is the clone of the second modem, one or more instructions for restricting the first modem from obtaining the requested service; and one or more instructions for providing services to the second modem, wherein the services are provided continuously to the second modem; else one or more instructions for providing the requested service to the first modem.

Various embodiments of the invention provide a method and a system for detecting cloning in a network. A modem with a MAC address can be cloned and network services can be obtained without actually paying to a service provider. However, various embodiments of the invention detect whether there is cloning in the network. Further, the cloned modem can be detected and restricted from availing the network services. Furthermore, the legitimate modem can continue to avail the network services without any disruption.

Although the invention has been discussed with respect to specific embodiments thereof, these embodiments are merely illustrative, and not restrictive, of the invention. For example, a 'method and system for cloned cable modem detection' can include any type of analysis, manual or automatic, to anticipate the needs of communicating data. Although specific terms relating to standards such as DOCSIS have been used, features of the invention may be used with other standards and approaches. For example, a "ranging request" in other embodiments may include a request for any type of network service. The states of "online" or "offline" need not indicate absolute access to a network or not but can include states of limited access to one or more resources, services or portions of a network.

Although specific protocols have been used to describe embodiments, other embodiments can use other transmission protocols or standards. Use of the terms 'peer', 'client', and 'server' can include any type of device, operation, or other process. The present invention can operate between any two processes or entities including users, devices, functional systems, or combinations of hardware and software. Peer-to-peer networks and any other networks or systems where the roles of client and server are switched, change dynamically, or are not even present, are within the scope of the invention.

Any suitable programming language can be used to implement the routines of the present invention including C, C++, Java, assembly language, etc. Different programming techniques such as procedural or object oriented can be employed. The routines can execute on a single processing device or multiple processors. Although the steps, operations, or computations may be presented in a specific order, this order may be changed in different embodiments. In some embodiments, multiple steps shown sequentially in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing.

In the description herein for embodiments of the present invention, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

Also in the description herein for embodiments of the present invention, a portion of the disclosure recited in the specification contains material, which is subject to copyright protection. Computer program source code, object code, instructions, text or other functional information that is executable by a machine may be included in an appendix, tables, figures or in other forms. The copyright owner has no objection to the facsimile reproduction of the specification as filed in the Patent and Trademark Office. Otherwise all copyright rights are reserved.

A 'computer' for purposes of embodiments of the present invention may include any processor-containing device, such as a mainframe computer, personal computer, laptop, notebook, microcomputer, server, personal data manager or 'PIM' (also referred to as a personal information manager), smart cellular or other phone, so-called smart card, set-top box, or any of the like. A 'computer program' may include any suitable locally or remotely executable program or sequence of coded instructions, which are to be inserted into a computer, well known to those skilled in the art. Stated more specifically, a computer program includes an organized list of instructions that, when executed, causes the computer to behave in a predetermined manner. A computer program contains a list of ingredients (called variables) and a list of directions (called statements) that tell the computer what to do with the variables. The variables may represent numeric data, text, audio or graphical images. If a computer is employed for presenting media via a suitable directly or indirectly coupled input/output (I/O) device, the computer would have suitable instructions for allowing a user to input or output (e.g., present) program code and/or data information respectively in accordance with the embodiments of the present invention.

A 'computer-readable medium' for purposes of embodiments of the present invention may be any medium that can contain and store the computer program for use by or in connection with the instruction execution system apparatus, system or device. The computer-readable medium can be, by way of example only but not by limitation, a semiconductor system, apparatus, system, device, or computer memory.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Further, at least some of the components of an embodiment of the invention may be implemented by using a programmed general-purpose digital computer, by using application specific integrated circuits, programmable logic devices, or field programmable gate arrays, or by using a network of interconnected components and circuits. Connections may be wired, wireless, by modem, and the like.

It will also be appreciated that one or more of the elements depicted in the drawings/figures can also be implemented in a more separated or integrated manner, or even removed or rendered as inoperable in certain cases, as is useful in accordance with a particular application.

Additionally, any signal arrows in the drawings/Figures should be considered only as exemplary, and not limiting, unless otherwise specifically noted. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

What is claimed is:

1. A method for providing a service in a network, the method comprising:
   receiving a request for the service from a first modem at a first address, wherein the first address is identical to a second address of a second modem, and wherein the network is configured to operate according to a data over cable service interface specification (DOCSIS);
   checking whether the first modem is a clone of the second modem by determining that the second modem is online, and if the second modem has completed one or more security negotiation processes, sending a ranging opportunity to the second modem and identifying the first modem to be the clone of the second modem if the second modem generates a ranging opportunity response, and if the second modem has not completed one or more of the security negotiation processes, configuring the first modem in the network, wherein the checking whether the second modem has completed the security negotiation processes comprises checking whether the second modem has completed a baseline privacy interface plus (BPI+) security negotiation process and a dynamic shared secret (DMIC) security process; and
   if the first modem is the clone of the second modem:
      restricting the first modem from obtaining the requested service; and
      providing services to the second modem, wherein the services are provided continuously to the second modem; and
   if the first modem is not the clone of the second modem, providing the requested service to the first modem.

2. The method of claim 1, wherein the first and second modems each comprise cable modems.

3. The method of claim 1, wherein the first address and the second address are medium access control (MAC) addresses.

4. The method of claim 1, wherein the first modem and the second modem are on an upstream port in the network.

5. A method for providing a service in a network, the method comprising:
   receiving a request for the service from a first modem at a first address, wherein the first address is identical to a second address of a second modem and the first modem and the second modem are on an upstream port, and wherein the network is configured to operate according to a data over cable service interface specification (DOCSIS);
   checking whether the first modem is a clone of the second modem by determining whether the second modem is online and the second modem has completed one or more security negotiation processes, assigning a false identity (ID) to the second modem on the upstream port, sending a ranging opportunity to the false ID on the upstream port, identifying the first modem to be the clone of the second modem if a ranging opportunity response is generated, and identifying the first modem and the second modem to be one modem if no ranging opportunity response is generated;
   if the first modem is the clone of the second modem:
      restricting the first modem from obtaining the requested service; and
      providing services to the second modem, wherein the services are provided continuously to the second modem; and
   if the first modem is not the clone of the second modem, providing the requested service to the first modem.

6. A system for providing a service in a network, the system comprising:
   a first modem at a first address, wherein the first modem sends a request for the service and the first address is identical to a second address, and wherein the network is configured to operate according to a data over cable service interface specification (DOCSIS);
   a second modem at the second address, wherein the second modem is present in the network; and
   a modem termination system (MTS), wherein the MTS identifies whether the first modem is a clone of the second modem and if the first modem is the clone of the second modem, the MTS provides continuous services to the second modem, wherein the identifying whether the first modem is a clone of the second modem comprises:
      determining that the second modem is online;
      if the second modem has completed one or more security negotiation processes, sending a ranging opportunity to the second modem, and identifying the first modem to be the clone of the second modem if the second modem generates a ranging opportunity response; and
      if the second modem has not completed one or more of the security negotiation processes, configuring the first modem in the network, wherein the checking whether the second modem has completed the security negotiation processes comprises checking whether the second modem has completed a baseline privacy interface plus (BPI+) security negotiation process and a dynamic shared secret (DMIC) security process.

7. The system of claim 6, wherein the first modem and the second modem are cable modems.

8. The system of claim 6, wherein the first modem and the second modem are wireless modems.

9. A system for providing a service in a network, the system comprising:
   means for receiving a request for the service from a first modem at a first address, the first address being identical to a second address of a second modem, wherein the network is configured to operate according to a data over cable service interface specification (DOCSIS);
   means for checking whether the first modem is a clone of the second modem by determining that the second modem is online, and if the second modem has completed one or more security negotiation processes, sending a ranging opportunity to the second modem and identifying the first modem to be the clone of the second modem if the second modem generates a ranging opportunity response, and if the second modem has not completed one or more of the security negotiation processes, configuring the first modem in the network, wherein the checking whether the second modem has completed the security negotiation processes comprises checking whether the second modem has completed a baseline privacy interface plus (BPI+) security negotiation process and a dynamic shared secret (DMIC) security process; and means for:
if the first modem is the clone of the second modem:
restricting the first modem from obtaining the requested service; and
providing services to the second modem continuously to the second modem;
if the first modem is not the clone of the second modem, providing the requested service to the first modem.

10. A system for providing a service in a network, the system comprising:
a modem termination system coupled to first and second modems via the network, wherein the modem termination system includes a processor for executing instructions, and wherein the network is configured to operate according to a data over cable service interface specification (DOCSIS); and
a computer-readable storage medium including instructions executable by the processor, the computer-readable storage medium including one or more instructions for:
receiving a request for the service from the first modem at a first address wherein the first address is identical to a second address of a second modem;
checking whether the first modem is a clone of the second modem by determining that the second modem is online, and if the second modem has completed one or more security negotiation processes, sending a ranging opportunity to the second modem and identifying the first modem to be the clone of the second modem if the second modem generates a ranging opportunity response, and if the second modem has not completed one or more of the security negotiation processes, configuring the first modem in the network, wherein the checking whether the second modem has completed the security negotiation processes comprises checking whether the second modem has completed a baseline privacy interface plus (BPI+) security negotiation process and a dynamic shared secret (DMIC) security process; and
if the first modem is the clone of the second modem:
restricting the first modem from obtaining the requested service; and
providing services to the second modem, wherein the services are provided continuously to the second modem; and
if the first modem is not the clone of the second modem, providing the requested service to the first modem.

11. The system of claim 10, wherein the first and second modems each comprise cable modems.

12. The system of claim 10, wherein the first address and the second address are medium access control (MAC) addresses.

13. The system of claim 10, wherein the first modem and the second modem are on an upstream port in the network.

14. A system for providing a service in a network, the system comprising:
a modem termination system coupled to first and second modems via the network, wherein the modem termination system includes a processor for executing instructions, and wherein the network is configured to operate according to a data over cable service interface specification (DOCSIS); and
a computer-readable storage medium including instructions executable by the processor, the computer-readable storage medium including one or more instructions for:
receiving a request for the service from the first modem at a first address wherein the first address is identical to a second address of the second modem and the first modem and the second modem are on an upstream port;
checking whether the first modem is a clone of the second modem by determining whether the second modem is online and the second modem has completed one or more security negotiation processes, assigning a false identity (ID) to the second modem on the upstream port, sending a ranging opportunity to the false ID on the upstream port, identifying the first modem to be the clone of the second modem if a ranging opportunity response is generated, and identifying the first modem and the second modem to be one modem if no ranging opportunity response is generated; and
if the first modem is the clone of the second modem:
restricting the first modem from obtaining the requested service; and
providing services to the second modem, wherein the services are provided continuously to the second modem; and
if the first modem is not the clone of the second modem, providing the requested service to the first modem.

15. A method for providing a service in a network, the method comprising:
using a modem termination system (MTS) to identify if a first modem is a clone of a second modem, wherein the network is configured to operate according to a data over cable service interface specification (DOCSIS); and
if the first modem is the clone of the second modem, using the MTS to provide continuous services to the second modem, wherein identifying whether the first modem is a clone of the second modem comprises:
determining that the second modem is online;
if the second modem has completed one or more security negotiation processes, sending a ranging opportunity to the second modem, and identifying the first modem to be the clone of the second modem if the second modem generates a ranging opportunity response; and
if the second modem has not completed one or more of the security negotiation processes, configuring the first modem in the network, wherein the checking whether the second modem has completed the security negotiation processes comprises checking whether the second modem has completed a baseline privacy interface plus (BPI+) security negotiation process and a dynamic shared secret (DMIC) security process.

16. The method of claim 15, wherein the first modem and the second modem are cable modems.

17. The method of claim 15, wherein the first modem and the second modem are wireless modems.

* * * * *